United States Patent [19]

Michaelson

[11] Patent Number: 5,612,965
[45] Date of Patent: Mar. 18, 1997

[54] MULTIPLE MEMORY BIT/CHIP FAILURE DETECTION

[75] Inventor: Wayne A. Michaelson, Circle Pines, Minn.

[73] Assignee: Unisys Corporation, Blue Bell, Pa.

[21] Appl. No.: 573,509

[22] Filed: Dec. 15, 1995

Related U.S. Application Data

[63] Continuation of Ser. No. 233,811, Apr. 26, 1994.

[51] Int. Cl.$^6$ .................................................. G06F 11/00
[52] U.S. Cl. ............................................................ 371/49.1
[58] Field of Search .................... 395/182.04; 364/266.3, 364/738, 945.6; 371/49.1, 51.1; 360/48; 358/335; 264/239

[56] References Cited

U.S. PATENT DOCUMENTS

| | | | |
|---|---|---|---|
| 3,761,695 | 9/1973 | Eichelberger | 235/153 |
| 4,195,770 | 4/1980 | Benton et al. | 371/21 |
| 4,225,958 | 9/1980 | Funatsu | 371/15 |
| 4,298,980 | 11/1981 | Hajdu et al. | 371/25 |
| 4,308,616 | 12/1981 | Timoc | 371/23 |
| 4,335,458 | 6/1982 | Krol | 371/38 |
| 4,369,511 | 1/1983 | Kimura et al. | 371/21 |
| 4,370,746 | 1/1983 | Jones et al. | 371/27 |
| 4,433,413 | 2/1984 | Fasang | 371/25 |
| 4,476,431 | 10/1984 | Blum | 324/73 |
| 4,493,077 | 1/1985 | Agrawal et al. | 371/25 |
| 4,513,283 | 4/1985 | Leininger | 340/825.02 |
| 4,534,028 | 8/1985 | Trischler | 371/25 |
| 4,535,467 | 8/1985 | Davis et al. | 377/81 |
| 4,546,272 | 10/1985 | Suzuki et al. | 307/455 |
| 4,566,104 | 1/1986 | Bradshaw et al. | 371/15 |
| 4,580,066 | 4/1986 | Berndt | 307/276 |
| 4,608,683 | 8/1986 | Shigaki | 370/13 |
| 4,628,217 | 12/1986 | Berndt | 307/467 |
| 4,670,876 | 6/1987 | Kirk | 371/3 |
| 4,701,920 | 10/1987 | Resnick et al. | 371/25 |
| 4,782,487 | 11/1988 | Smelser | 371/21 |
| 4,783,785 | 11/1988 | Hanta | 371/25 |
| 4,788,684 | 11/1988 | Kawaguchi et al. | 371/21 |
| 4,835,774 | 5/1989 | Ooshima et al. | 371/25 |
| 4,847,519 | 7/1989 | Wahl et al. | 307/296.2 |
| 4,876,685 | 10/1989 | Rich | 371/21.6 |
| 4,888,772 | 12/1989 | Tanigawa | 371/21.2 |
| 4,903,266 | 2/1990 | Hack | 371/21.2 |
| 5,107,501 | 4/1992 | Zorian | 371/213 |
| 5,138,619 | 8/1992 | Fasang et al. | 371/21.2 |
| 5,155,735 | 10/1992 | Nash et al. | 371/49.1 |
| 5,228,132 | 7/1993 | Neal et al. | 395/425 |

OTHER PUBLICATIONS

IBM Technical Disclosure Bulletin, vol. 18, No. 5, Oct. 1975, pp. 1415–1416.
IBM Technical Disclosure Bulletin, vol. 25, No. 10, Mar. 1983, pp. 5196–5198.
Electronics, "Level–Sensitive Scan Design Test Chips, Boards, System, Neil C. Berglund", vol. 52, No. 6, Mar. 15, 1979, pp. 108–110.

*Primary Examiner*—Robert W. Beausoliel, Jr.
*Assistant Examiner*—Stephen C. Elmore
*Attorney, Agent, or Firm*—Nawrocki, Rooney & Sivertson, P.A.

[57] ABSTRACT

An apparatus for efficiently detecting errors in a system having a plurality of memory devices. The present invention uses a single parity bit configuration to detect common data errors caused by faulty memory devices including multiple data errors within one memory device. This is accomplished by effectively turning a multiple bit error detection situation into a single bit error detection situation. Thus, instead of allocating a contiguous block of bits to the same memory unit, the present invention allocates bits across all memory units in a round-robin fashion. The parity domains are defined such that multiple errors within one SRAM can be detected despite only using a single bit parity configuration.

20 Claims, 7 Drawing Sheets

PRIOR ART

50

| SRAM # | BIT-0 | BIT-1 | BIT-2 | BIT-3 | BIT-4 | BIT-5 | BIT-6 | BIT-7 |
|---|---|---|---|---|---|---|---|---|
| 0 | 0 | 1 | 2 | 3 | 4 | 5 | 6 | P0 |
| 1 | 7 | 8 | 9 | 10 | 11 | 12 | 13 | P1 |
| 2 | 14 | 15 | 16 | 17 | 18 | 19 | 20 | P2 |
| 3 | 21 | 22 | 23 | 24 | 25 | 26 | 27 | P3 |
| 4 | 28 | 29 | 30 | 31 | 32 | 33 | 34 | P4 |
| 5 | 35 | 36 | 37 | 38 | 39 | 40 | 41 | P5 |
| 6 | 42 | 43 | P6 | A0 | A1 | P7 | -- | -- |

| PARITY DOMAINS |
|---|
| P0 - BITS 0-6 |
| P1 - BITS 7-13 |
| P2 - BITS 14-20 |
| P3 - BITS 21-27 |
| P4 - BITS 28-34 |
| P5 - BITS 35-41 |
| P6 - BITS 42-43 |
| P7 - UNUSED |
| A0 - EVEN ADRS LINES |
| A1 - ODD ADRS LINES |

54

| BIT DESCRIPTION | | |
|---|---|---|
| BITS | 0-43 | INSTRUCTION |
| BITS | P0-P7 | PARITY |
| BITS | A0-A1 | ADDRESS PARITY |

| SRAM # | BIT-0 | BIT-1 | BIT-2 | BIT-3 | BIT-4 | BIT-5 | BIT-6 | BIT-7 |
|---|---|---|---|---|---|---|---|---|
| 0 | 0 | 6 | 12 | 18 | 24 | 30 | 36 | 40 |
| 1 | 1 | 7 | 13 | 19 | 25 | 31 | -- | 41 |
| 2 | 2 | 8 | 14 | 20 | 26 | 32 | -- | 42 |
| 3 | 3 | 9 | 15 | 21 | 27 | 33 | 37 | 43 |
| 4 | 4 | 10 | 16 | 22 | 28 | 34 | 38 | A0 |
| 5 | 5 | 11 | 17 | 23 | 29 | 35 | 39 | A1 |
| 6 | P0 | P1 | P2 | P3 | P4 | P5 | P6 | P7 |

| PARITY DOMAINS |
|---|
| P0 - BITS 0-5 |
| P1 - BITS 6-11 |
| P2 - BITS 12-17 |
| P3 - BITS 18-23 |
| P4 - BITS 24-29 |
| P5 - BITS 30-32 & 37 |
| P6 - BITS 33-36 |
| P7 - 37-43 |
| A0 - EVEN ADRS LINES |
| A1 - ODD ADRS LINES |

| BIT DESCRIPTION | |
|---|---|
| BITS 0-43 | INSTRUCTION |
| BITS P0-P7 | PARITY |
| BITS A0-A1 | ADDRESS PARITY |

MULTIPLE MEMORY BIT/CHIP FAILURE DETECTION

CROSS REFERENCE TO CO-PENDING APPLICATIONS

The present application is a continuation of U.S. Ser. No. 08/233,811, filed Apr. 26, 1994, and which is related to U.S. patent application Ser. No. 08/225,891, filed Apr. 11, 1994, entitled "Control Store Built-In-Self-Test", and U.S. patent application Ser. No. 07/978,093, filed Nov. 17, 1992, entitled "Continuous Embedded Parity Checking for Error Detection in Memory Structures", and U.S. patent application Ser. No. 08/173,408, filed Dec. 23, 1993, entitled "Micro Engine Dialogue Interface", all assigned to the assignee of the present invention and all incorporated herein by reference.

BACKGROUND OF THE INVENTION

1. Field of the Invention

The present invention is generally related to general purpose, stored program, digital computers and more particularly relates to efficient means for performing memory error detection.

2. Description of the Prior Art

A key design element of high reliability computer systems is that of error detection and correction. It has long been recognized that the integrity of the data bits within the computer system is critical to ensure the accuracy of operations performed in the data processing system. The alteration of one data bit in a data word can dramatically affect arithmetic calculations or can change the meaning of a data word as interpreted by other sub-systems within the computer system. Often the cause of an altered data bit is traced to a faulty memory element within the computer system and therefore it is critical that error detection be performed on the memory elements.

One method for performing error detection on the memory elements is to associate an additional bit, called a "parity bit", along with the binary bits comprising an addressable word. This method involves summing without carry the bits representing a "one" within a data word and providing an additional "parity bit" so that the total number of "ones" across the data word including the added parity bit is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. When the system stores a data word into memory, the parity generation circuit generates a parity bit from the data word and the system stores both the data word and the corresponding parity bit into an address location in a memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified.

It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of a multiple errors within a data word increase. Therefore, methods to detect multiple errors within a data word are essential.

System designers have developed methods for detecting multiple errors within multiple bit data words by providing multiple parity bits for each multiple bit data word. Although this technique has been successfully used, it significantly increases the overhead required to perform error detection because the parity generation circuit is more complex and the additional parity bits must be stored along with each data word. It can readily be seen that each additional parity bit that is included within a system adds a significant amount of overhead to the system.

Parity generation techniques are also used to perform error correction within a data word. Error correction is typically performed by encoding the data word to provide error correction code bits that are stored along with the bits of the data word. Upon readout, the data bits read from the addressable memory location are again subject to the generation of the same error correction code signal pattern. The newly generated pattern is compared to the error correction code signals stored in memory. If a difference is detected, it is determined that the data word is erroneous. Depending on the encoding system utilized it is possible to identify and correct the bit position in the data word indicated as being incorrect. The system overhead for the utilization of error correction code signals is substantial. The overhead includes the time necessary to generate the error correction codes, the memory cells necessary to store the error correction codes for each corresponding data word, and the time required to perform the decode when the data word is read from memory. These represent disadvantages to the error correction code system.

As can be seen from the previous discussion, a single parity bit system which stores the parity bit along with the data word requires the least amount of overhead within the system. The disadvantage of a single parity bit system is that only single bit failures can be detected. In prior art systems, a parity bit is typically provided for each data word that is stored within a memory device. Furthermore, the parity bit and the corresponding data word are typically stored at the same address location within the memory device. This is true even if there are multiple memory devices within the computer system. That is, each memory unit is treated independent from the others and therefore each memory unit stores both data words and the corresponding parity bits. Typically, there are three types of errors that occur within a memory device. The first type of error is an error in any single bit within the memory device. These errors will be detected by a single parity bit being stored along with the corresponding data word as discussed above. The second type of error is an error in multiple bits in a memory device. For example, if bit 0 and bit 1 both failed, they may cancel each other out when it comes to computing the parity bit, and the error may go undetected. This is a result of the two bits being in the same "parity domain". A parity domain is defined as a group of bits from which the parity bit is being calculated. Thus some multiple bit errors in a memory device will not be detected under the single bit parity method as described above. The third type of error is a chip failure.

For example, if an address driver in a memory device fails, a location within the memory device other than the intended location may be read, but a valid parity bit could still result. Thus a chip failure may not be detected under the single parity bit method as described above.

It is apparent that the previously described single bit parity configuration is highly desirable because of the low system overhead but the ability of this configuration to detect typical errors within a memory device is limited.

SUMMARY OF THE INVENTION

Figure 4:
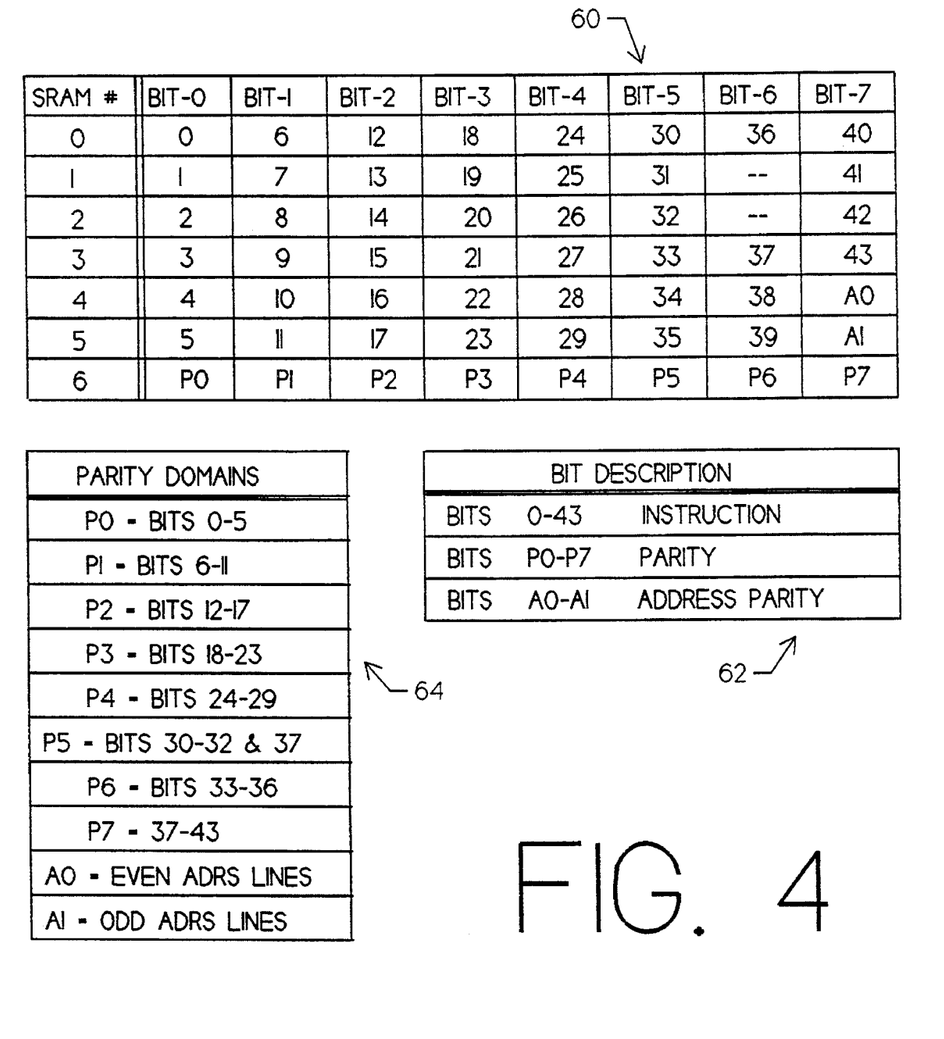
FIG. 4 is a set of three tables showing the preferred embodiment of the present invention for distributing parity domains within a multiple memory system.

The present invention overcomes the disadvantages found in the prior art by providing a method of allocating parity bits within a multi-memory Control Store in a manner that maximizes the ability to detect the most probable memory device failures as described in the previous section. In prior art systems having multiple memory elements for storing data, a particular data word is written to a given memory location within one of the multiple memory elements along with the corresponding parity bit. Therefore, a contiguous block of data bits making up a data word along with the corresponding parity bit are stored in one of the multiple memory devices. In the present invention, instead of allocating a contiguous block of bits to the same memory device, the data bits are allocated across the memory devices in a round-robin fashion. Therefore, in a system having seven 32K words×8 bit SRAM's forming a Control Store for storing a 44 bit data unit, bits 0–5 of the data unit are allocated to SRAM 0, 1, 2, 3, 4, and 5 respectively, as shown in FIG. 4. The parity bit for bits 0–5 is stored in SRAM 6. Similarly, bits 6–43 are allocated across the SRAMs as shown in FIG. 4. Since two bits of the 56 bits possible to be stored by the Control Store are to be unused, they have been allocated to SRAM 1 and SRAM 2 as shown. The parity domains are defined in the table shown in FIG. 4.

The present invention detects all three memory device failure types discussed above. First, the present invention provides for the detection of single bit errors in the Control Store because all bits of a data unit are contained in at least one parity domain. For example, if bit 3 failed, it would be detected by P0. The second error type, that of multiple bit errors on the same SRAM, will be detected by the present invention because the bits of a data unit in one SRAM are all in different parity domains (see FIG. 4). So if more than one bit fails, their respective parity bits will detect the error. This method effectively turns the multiple bit error detection situation into a single bit error detection situation. Finally, if an address driver on an SRAM fails resulting in an address location other than the intended address location to be read, the error will be detected because the bits affected are spread out across multiple parity domains. Again, this method effectively turns an SRAM failure into a single bit error detection situation.

The present invention is not limited to the configuration described above. Both the size and number of the memory devices which are included in the system can be varied and still be within the scope of this invention. In addition, the parity interleaving configuration described herein is the preferred embodiment of the present invention and does not limit the scope of the present invention. One skilled in the art would recognize that other interleaving configurations can be used to achieve similar results.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
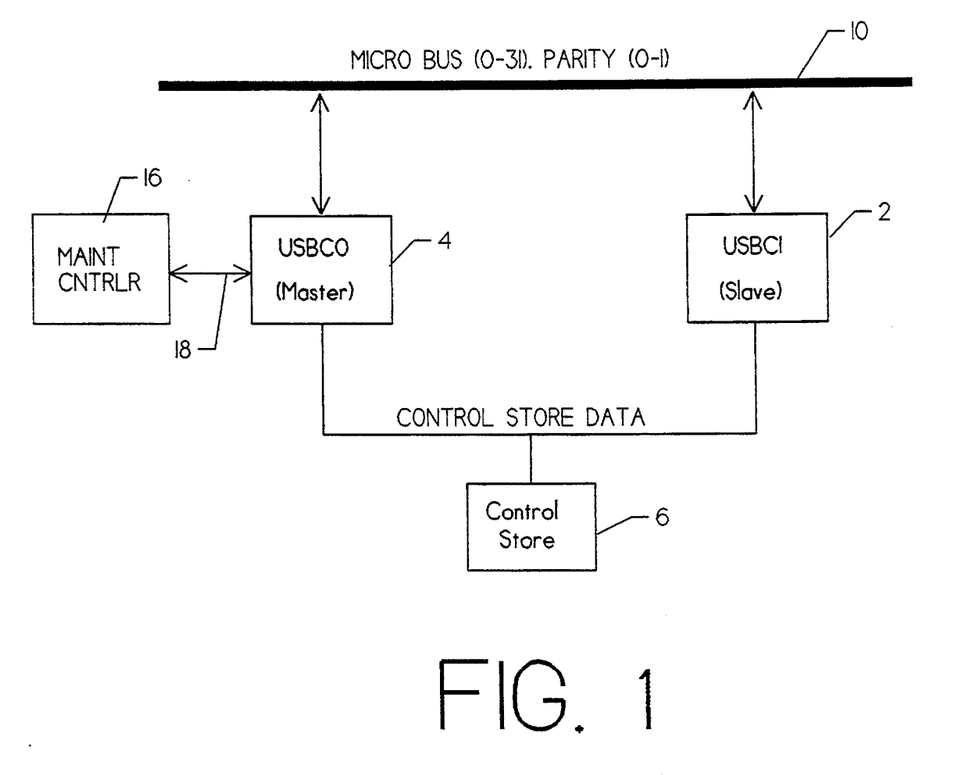
FIG. 1 is a block diagram of a Micro Bus interface to a Control store within a Host Interface Adapter (HIA) within the Extended Processing Complex (XPC) system of the present invention.

FIG. 1 is a block diagram of a Micro Bus interface to a Control store within a Host Interface Adapter (HIA) of the Extended Processing Complex (XPC) system. The Host Interface Adaptor (HIA) cards in the Extended Processing Complex (XPC) system utilize dual Micro Sequencer Bus Controllers USBC0 4 and USBC1 2 to control other VLSIs on the card. These microprocessors access the other VLSIs via Micro Bus 10. Control Store 6 is used to store the microcode instructions that are executed by USBC0 4 and USBC1 2. In the preferred embodiment, a microcode instruction is 44 bits wide. Control Store 6 consists of seven static random access memory (SRAM) chips. Each SRAM holds 32K 8-bit words of data. Each data unit stored in Control Store 6 consists of 44 bits of microcode instruction, 8 bits of parity for the instruction, and 2 bits of address bit parity (one bit for even address lines and one bit for odd address lines). Thus the number of bits in a storage unit is 54 bits. Since there are seven SRAMs, each holding 8 bits per word, a total of 56 bits is available for storage of a storage unit if part of the storage unit is stored in each of the seven SRAMs (54 bits being used and 2 bits being unused). Therefore Control Store 6 can hold 32K storage units. Control Store 6 is loaded with the microcode instructions at system initialization. A maintenance controller 16 loads USBC0 4 via a maintenance interface 18 which in turn loads Control Store 6. The parity bits and address bits are computed by the maintenance controller and appended to each microcode instruction as it is stored. Later, as USBC0 4 and USBC1 2 are executing microcode instructions, each microcode instruction is fetched from Control Store 6 and the corresponding parity values are computed from it. The microprocessors USBC0 4 and USBC1 2 compare the parity values computed against the parity values stored in Control Store 6. If there are any discrepancies, Control Store 6 is assumed to be corrupted and an internal check condition is set in both USBC0 4 and USBC1 2. This is a fatal error for USBC processing. The error is reported and processing is halted.

Figure 2:
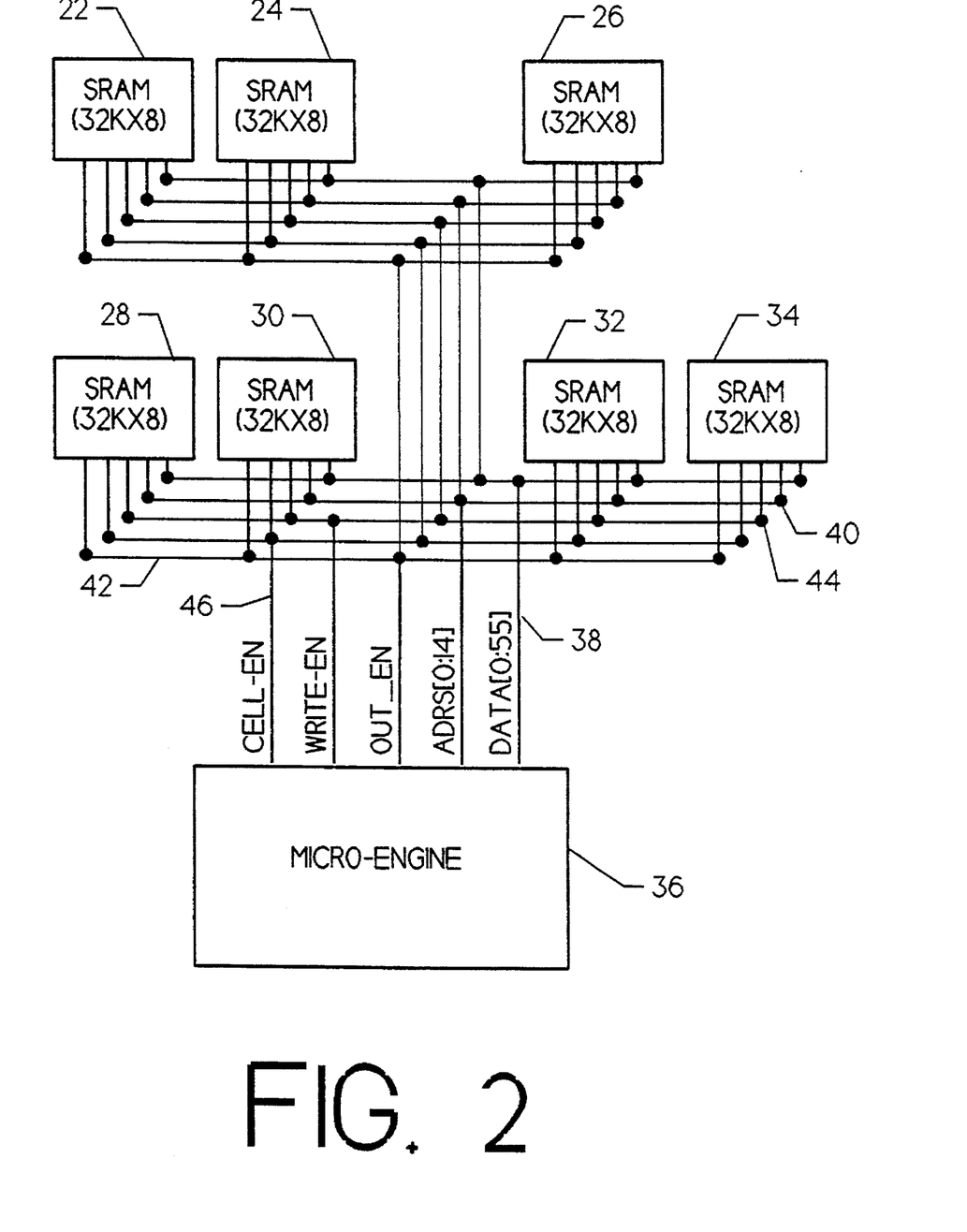
FIG. 2 is a block diagram of a Micro-Engine and SRAM interconnections of the preferred embodiment of Control Store 6.

FIG. 2 is a block diagram of the board level interconnect between one micro-engine and seven (7) 32K×8 SRAMs of the preferred embodiment of Control Store 6. FIG. 2 represents a typical memory card within a large computer system. The preferred embodiment of Control Store 6 contains seven (7) 32K×8 SRAM's which provide memory for one micro-engine chip. Details regarding the micro-engine chip can be found in the Applications incorporated herein by reference. SRAM's 22, 24, 26, 28, 30, 32, and 34 are all identical. Each of these SRAM's have a fifteen (15) bit address port, an eight (8) bit bi-directional data port, an output enable port, a write enable port, and a cell enable port. Micro-engine 36 provides a 56 bit Data Bus 38 which is communicatively coupled to the seven (7) separate 8 bit data ports of SRAM's 22, 24, 26, 28, 30, 32, and 34. Therefore, Data Bus 38 provides a separate 8 bit data port to each of the seven (7) SRAMs.

Micro-Engine 36 also provides 15 bit Address Bus 40 which is communicatively coupled to the 15 bit address ports of RAMs 22, 24, 26, 28, 30, 22, and 34. Therefore, Address Bus 40 is connected in parallel to all of the aforementioned SRAM's.

Micro-engine 36 also provides an Output Enable port 42 to all of the SRAM devices. The Output Enable port 42 controls the direction of the bi-directional Data Bus 38. During a read operation, Data Bus 38 is enabled via Output Enable 42 allowing the SRAM's to drive onto Data Bus 38. During a write operation, the output drivers are disabled via Output Enable 42 thus allowing Micro-Engine 36 to drive onto Data Bus 38.

Micro-Engine 36 also provides for Write Enable 44 which is communicatively coupled to SRAMs 22, 24, 26, 28, 30, 32, and 34. Write Enable 44 controls whether the SRAM's are in read mode or in write mode. Finally, Micro Engine 36 provides for Cell Enable 46 which is communicatively coupled to the RAM enable port of SRAMs 22, 24, 26, 28, 30, 32, and 34. Cell Enable 46 controls whether the SRAM is enabled. In the preferred mode, all cell enable ports of the SRAMs are tied together and tied active on the card. Therefore, in the preferred embodiment, the entire card of SRAM's are enabled all of the time.

Figure 3:
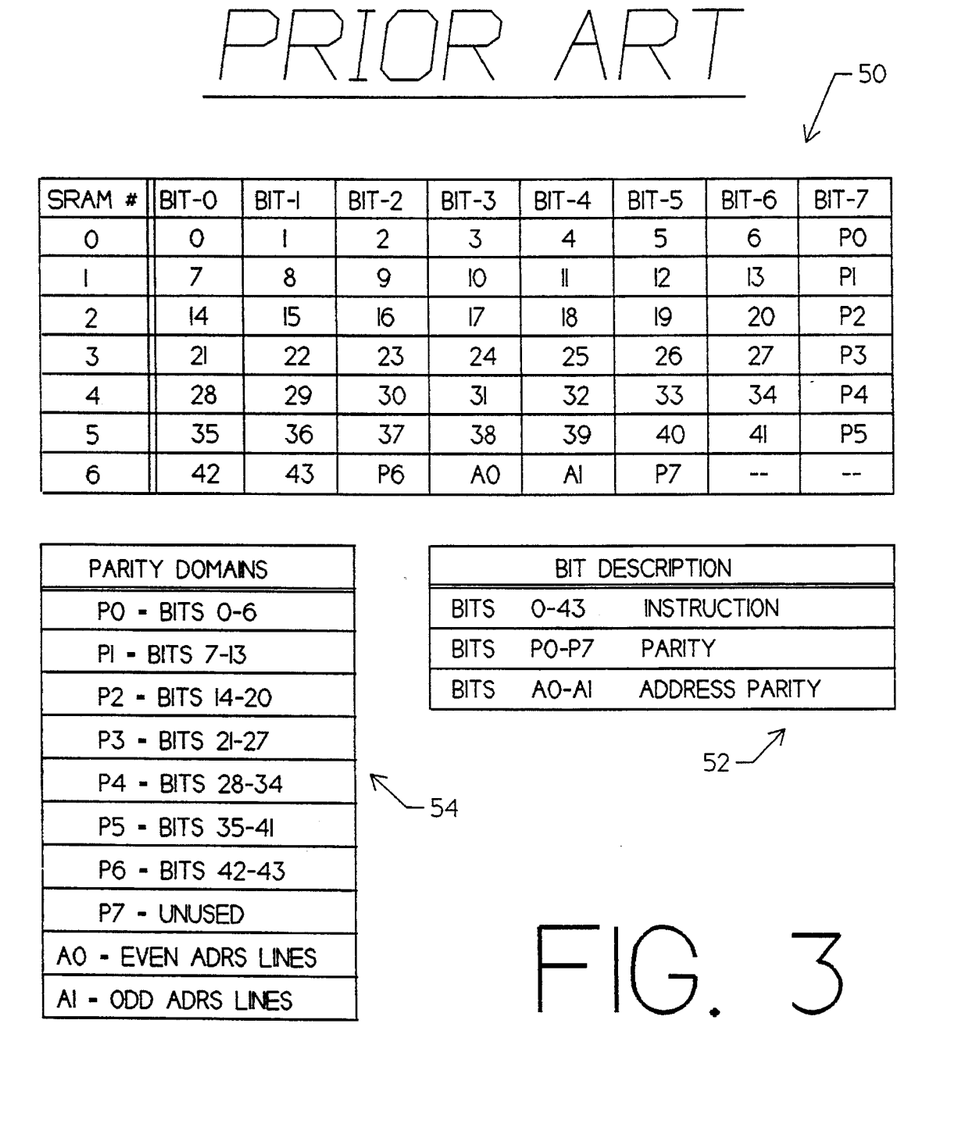
FIG. 3 is a set of three tables showing the prior art method for distributing parity domains within a multiple memory system.

FIG. 3 is a set of three tables showing the prior art method for distributing parity domains within a multiple memory device system. The prior art method shown in FIG. 3 has bits 0–6 of the data unit stored in SRAM #0 along with a parity bit whose parity domain is bits 0–6 as indicated in the first row of table 50. Similarly, SRAM #1, #2, #3, #4, and #5 receive portions of the data unit as shown, along with the corresponding parity bits. In SRAM #6, the final two bits of the data unit are stored along with the two address parity bits. The eighth parity bit (P7) is unused, as well as the two remaining bits in the 56-bit data unit as indicated in the last row of table 50.

Table 52 of FIG. 3 contains a bit description of the relevant bits referenced in tables 50 and 54. Table 54 shows that P0 represents the parity bit for the parity domain covering bits 0–6 of the data unit. Similarly, P1 represents the parity bit for the parity domain covering bits 7–13 of the data unit. This continues sequentially for all bits in the 43 bit data unit. Therefore, P6 represents the parity bit for the parity domain covering bits 42–43 of the data unit. In the prior art method illustrated by FIG. 3, P7 is unused. Finally, A0 represents a bit containing "odd" parity of the even numbered address lines while A1 represents a bit containing "odd" parity of the odd numbered address lines. Note that in this prior art embodiment, the parity bit is stored in the same SRAM as the corresponding data bits.

One of the goals for the design of the XPC system is to be able to detect and capture an error at any single point of failure. There are three types of errors that need to be detected in Control Store 6. The first type of error is an error in any single bit in the Control Store. In the prior art allocation method described in FIG. 3, any single bit failure will be detected by the parity bit for the parity domain that includes the failing bit. The second type of error is an error in multiple bits in an SRAM. For example, if bit 0 and bit 1 both failed, they might cancel each other out when it comes to computing the parity bit, and the error may go undetected. This is a result of the two bits being in the same parity domain. Thus some multiple bit errors on an SRAM will not be detected under the prior art method shown in FIG. 3. The third type of error is a chip failure. For example, if an address driver in a memory device fails, a location within the memory device other than the intended location may be read, but a valid parity bit could still result. Thus a full chip failure will not be detected under the prior art method shown in FIG. 3.

FIG. 4 is a set of three tables showing the preferred embodiment of the present invention for distributing parity domains throughout Control Store 6. To overcome the deficiencies in error detection described in FIG. 3, a new method of allocation has been devised and is shown in FIG. 4. Instead of allocating a contiguous block of bits to the same SRAM, this method allocates the bits across the SRAMs in a round-robin fashion. Note in table 60, bits 0–5 of the data unit are allocated to SRAM #1, #2, #3, #4, and #5 respectively. The parity bit for bits 0–5 is stored in SRAM #6 as indicated by P0. Similarly, bits 6–43 are allocated across the SRAMs as shown in table 60. Since two bits of the 56 bits possible are to be unused, they have been allocated to SRAM #1 and SRAM #2 as shown in the second to last column of table 60.

Table 62 of FIG. 4 contains a bit description of the relevant bits referenced in tables 60 and 64. The parity domains of the present invention are defined in table 64 of FIG. 4. Note that the present invention changes the parity domains over the prior art. In the preferred embodiment, the parity domains generally include only six (6) data unit bits rather than the seven (7) as shown in FIG. 3. Therefore parity domain zero (P0) represents the parity bit for the parity domain covering bits 0–5 of the data unit. Similarly, P1 represents the parity bit for the parity domain covering bits 6–11 of the data unit. This continues sequentially up through the bits of the data unit. However, one field in the preferred embodiment of the present invention holds an address that is seven bits long. This field is stored in bits 37–43 of the data unit. In order to support efficient address generation, parity bit 7 (P7) holds the parity for this field. But bit 37 and bit 43 are in the same SRAM (i.e. SRAM #3—see the last two columns of table 60). Thus a failure in SRAM #3 affecting bits 37 and 43 could cause the errors to cancel each other out when P7 is computed and the errors may go undetected. To prevent this problem, bit 37 is also included in the parity domain of P5.

The present invention detects all three error types discussed above. The present invention provides for the detection of single bit errors in the Control Store because all bits of a data unit are contained in at least one parity domain. For example, if bit 3 failed, it would be detected by P0. The second error type, that of multiple bit errors on the same SRAM, will be detected by this method because the bits of a data unit in one SRAM are all in different parity domains.

So if more than one bit fails, their respective parity bits will detect the error. This method effectively turns the multiple bit error detection situation into a single bit error detection situation. Finally, if an address driver on an SRAM fails resulting in an address location other than the intended address location to be read, the error will be detected because the bits affected are spread out across multiple parity domains. Again, this method effectively turns an SRAM failure into a single bit error detection situation.

Figure 5:
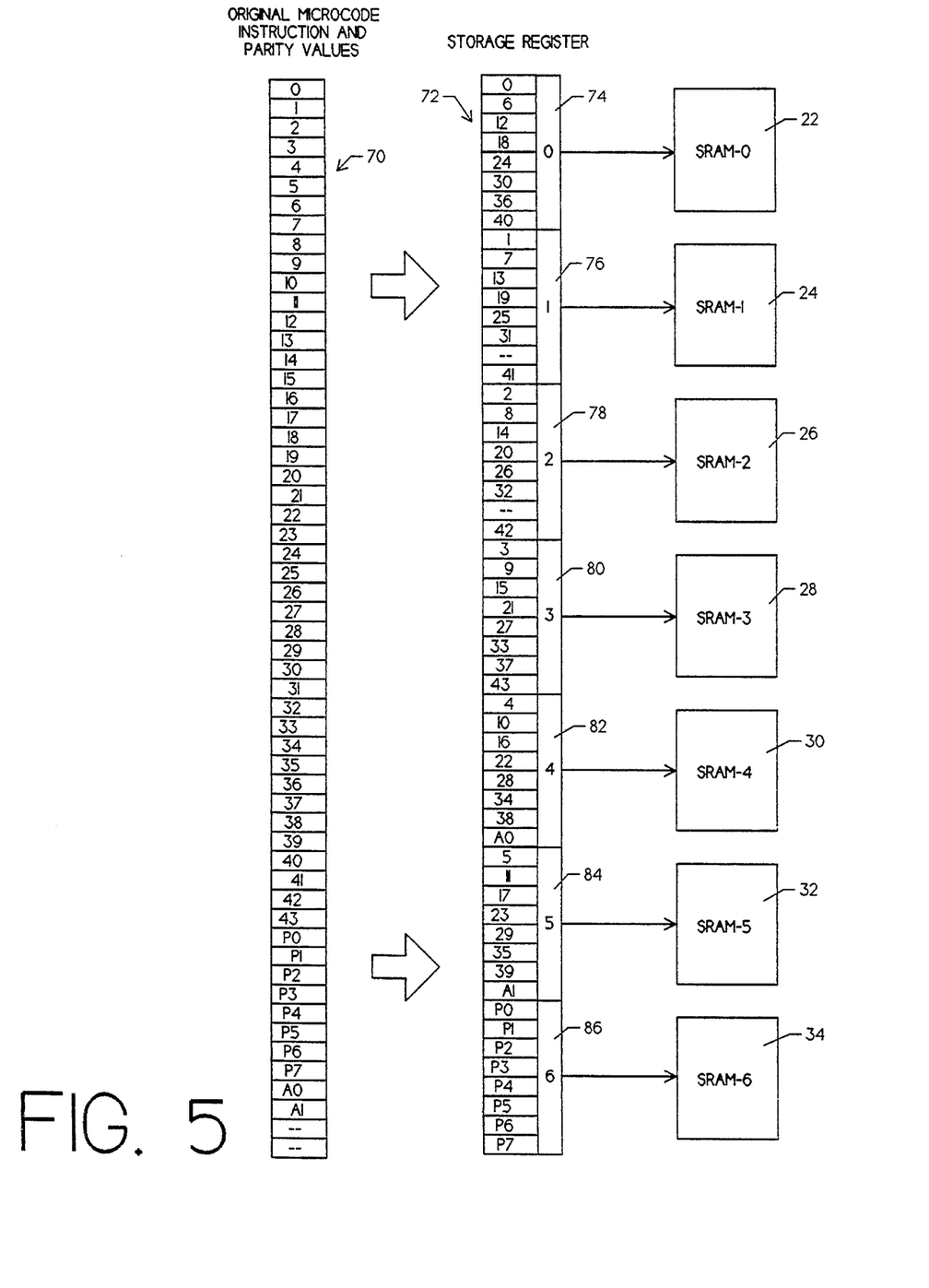
FIG. 5 shows the preferred embodiment of the present invention for loading a microcode instruction into a multiple memory system.
Figure 6:
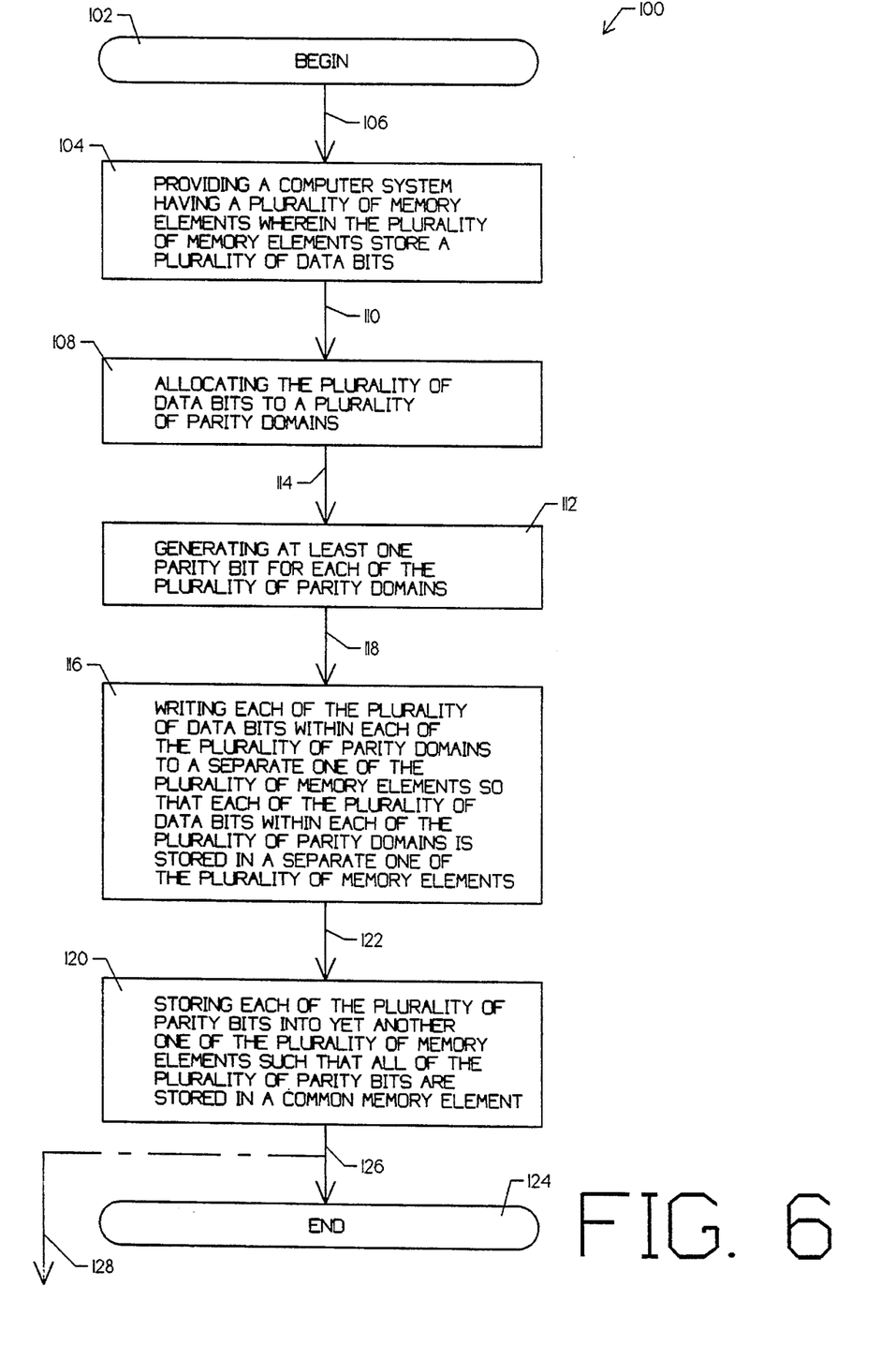
FIG. 6 is a flow diagram showing an exemplary method of the present invention.
Figure 7:
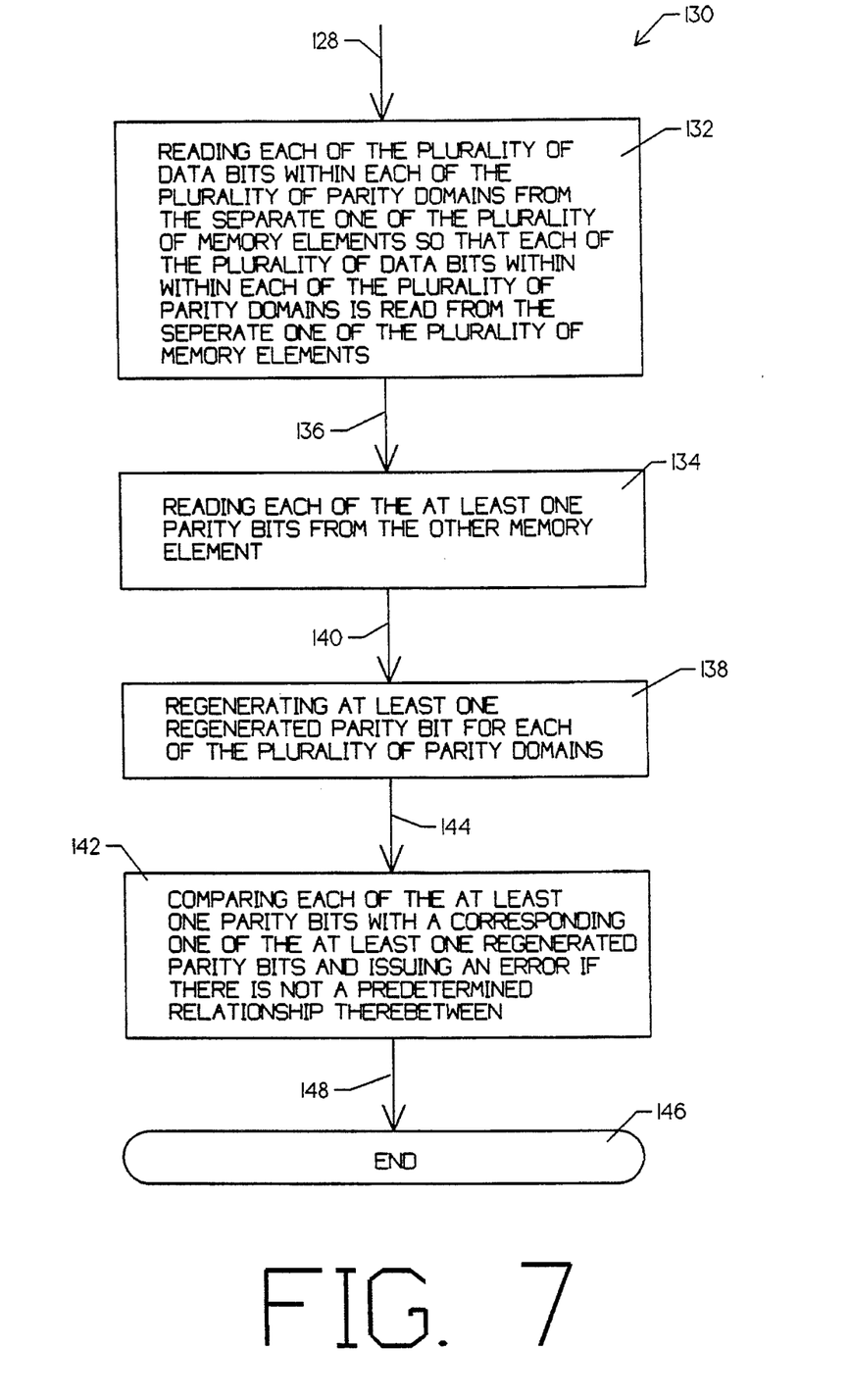
FIG. 7 is a flow diagram continuing from FIG. 6, showing an exemplary method of the present invention.

FIG. 5 is showing the preferred embodiment of the present invention for loading a microcode instruction into Control Store 6. FIG. 5 illustrates the loading of a microcode instruction and its associated parity values into Control Store 6 at system initialization time. The microcode instruction bits, parity bits, and address parity bits are distributed into seven different 8-bit words 74, 76, 78, 80, 82, 84, and 86 of Storage Register 72. For example, word-0 74 is loaded with bits 0, 6, 12, 18, 24, 30, 36, and 40 from the original microcode instruction 70. Similarly, the other six words 76, 78, 80, 82, 84, and 86 are loaded with the bits shown in storage register 72. The words of Storage Register 72 are then written into SRAMs 22, 24, 26, 28, 30, 32, and 34.

Having thus described the preferred embodiments of the present invention, those of skill in the art will readily appreciate that yet other embodiments may be made and used within the scope of the claims hereto attached.

We claim:

1. An apparatus for detecting errors within a digital computer system wherein the digital computer system has a plurality of memory elements for storing a plurality of data bits, the plurality of data bits being allocated to a plurality of parity domains, comprising:

a. parity computing means coupled to the plurality of memory elements for computing at least one corresponding parity bit for each particular one of the plurality of parity domains, thereby resulting in a plurality of corresponding parity bits; and b. memory writing means coupled to the plurality of memory elements and to said parity computing means for writing the plurality of data bits and said plurality of corresponding parity bits into the plurality of memory elements, said memory writing means writing each particular one of the plurality of data bits within said particular one of the plurality of parity domains to a separate one of the plurality of memory elements using round-robin storage allocation, each said particular one of the plurality of data bits being in at least one particular one of the plurality of parity domains having no greater than one data bit for each said separate one of the plurality of memory elements and further writing said plurality of corresponding parity bits into a selected one of the plurality of memory elements.

2. An apparatus according to claim 1 further comprising:

c. memory reading means coupled to the plurality of memory elements for reading the plurality of data bits and the plurality of corresponding parity bits from the plurality of memory elements, said memory reading means reading the particular one of the plurality of data bits within the particular one of the plurality of parity domains from the separate one of the plurality of memory elements, the particular one of the plurality of data bits being in at least one particular one of the plurality of parity domains having no greater than one data bit for each of the separate one of the plurality of memory elements, and further reading said plurality of corresponding parity bits from the selected one of the plurality of memory elements;

d. parity recomputing means coupled to the plurality of memory elements and to said memory reading means for recomputing at least one corresponding recomputed parity bit for each of the plurality of parity domains, thereby resulting in a plurality of corresponding recomputed parity bits; and e. comparing means coupled to said memory reading means and to said parity recomputing means for comparing each of said plurality of corresponding parity bits with a corresponding one of said plurality of corresponding recomputed parity bits and determining if a predetermined relationship exists therebetween.

3. An apparatus according to claim 2 wherein the plurality of memory elements are Random Access Memories, thereby resulting in a plurality of Random Access Memories, each of said plurality of Random Access Memories having an address input.

4. An apparatus according to claim 3 wherein the address input of each of said plurality of Random Access Memories are coupled together in a parallel configuration to form an address bus.

5. An apparatus according to claim 4 wherein said address bus comprises an address parity domain.

6. An apparatus according to claim 3 wherein said memory reading means and said memory writing means are part of a micro engine.

7. An apparatus according to claim 4 wherein said plurality of data bits comprise an instruction within the digital computer system.

8. A method for detecting errors in a computer system wherein the computer system has a plurality of memory elements, the plurality of memory elements capable of storing a plurality of data bits, each of the plurality of data bits being allocated to a corresponding one of a plurality of parity domains wherein at least one parity bit is computed for each of the plurality of parity domains thereby resulting in a plurality of parity bits, comprising the steps of:

a. writing the plurality of data bits into the plurality of memory elements so that each particular one of the plurality of data bits within a corresponding one of the plurality of parity domains is stored in a separate one of the plurality of memory elements using round-robin storage allocation, said particular one of the plurality of data bits being in at least one said corresponding one of the plurality of parity domains having no greater than one data bit for each said separate one of the plurality of memory elements; and b. storing each of the plurality of parity bits into a selected one of the plurality of memory elements such that all of the plurality of parity bits are stored in a common memory element.

9. A method according to claim 8 further comprising:

c. reading the plurality of data bits of each of the plurality of parity domains from the plurality of memory elements so that the particular one of the plurality of data bits within the corresponding one of the plurality of parity domains is read from the separate one of the plurality of memory elements, the particular one of the plurality of data bits being in at least one of the corresponding one of the plurality of parity domains having no greater than one data bit for each of the separate one of the plurality of memory elements;

d. reading the plurality of parity bits from the selected one of the plurality of memory elements such that all of the plurality of parity bits are read from a common memory;

e. recomputing at least one recomputed parity bit for each corresponding one of the plurality of parity domains read in step (c), thereby resulting in a plurality of recomputed parity bits; and f. comparing the plurality of parity bits with said plurality of recomputed parity bits recomputed in step (e) and issuing an error if there is not a predetermined relationship therebetween.

10. An apparatus for detecting errors within a digital computer system wherein the digital computer system has a plurality of memory elements for storing a plurality of data bits, the plurality of data bits being allocated to a plurality of parity domains, each of the plurality of parity domains having at least one corresponding parity bit associated therewith, thereby resulting in a plurality of corresponding parity bits, comprising:

a. providing element coupled to the plurality of memory elements for providing the plurality of data bits and the plurality of corresponding parity bits to the plurality of memory elements, said providing element providing each particular one of the plurality of data bits within each of the plurality of parity domains to a separate one of the plurality of memory elements using round-robin storage allocation, each said particular one of the plurality of data bits being in at least one particular one of the plurality of parity domains having no greater than one data bit for each said separate one of the plurality of memory elements and further providing the plurality of corresponding parity bits to at least one other of the plurality of memory elements.

11. An apparatus for detecting errors within a digital computer system wherein the digital computer system has a plurality of memory elements for storing a plurality of data bits, each of the plurality of memory elements further having address inputs coupled together in a parallel configuration to form a common set of address bits, the plurality of data bits being allocated to a plurality of parity domains, comprising:

a. parity computing means coupled to the plurality of memory elements for computing at least one corresponding parity bit for each particular one of the plurality of parity domains, said each particular one of the plurality of parity domains corresponding to a particular address within said common set of address bits, thereby resulting in a plurality of corresponding parity bits; and b. memory writing means coupled to the plurality of memory elements and to said parity computing means for writing the plurality of data bits and said plurality of corresponding parity bits into the plurality of memory elements, said memory writing means writing each particular one of the plurality of data bits within said particular one of the plurality of parity domains to a separate one of the plurality of memory elements using round-robin storage allocation, each said particular one of the plurality of data bits being in at least one particular one of the plurality of parity domains having no greater than one data bit for each said separate one of the plurality of memory elements and further writing said plurality of corresponding parity bits into a selected one of the plurality of memory elements.

12. An apparatus according to claim 11 further comprising:

c. memory reading means coupled to the plurality of memory elements for reading the plurality of data bits and the plurality of corresponding parity bits from the plurality of memory elements, said memory reading means reading the particular one of the plurality of data bits within the particular one of the plurality of parity domains from the separate one of the plurality of memory elements, the particular one of the plurality of data bits being in at least one particular one of the plurality of parity domains having no greater than one data bit for each of the separate one of the plurality of memory elements, and further reading said plurality of corresponding parity bits from the selected one of the plurality of memory elements;

d. parity recomputing means coupled to the plurality of memory elements and to said memory reading means for recomputing at least one corresponding recomputed parity bit for each of the plurality of parity domains, said each particular one of the plurality of parity domains corresponding to a particular address within said common set of address bits, thereby resulting in a plurality of corresponding recomputed parity bits; and e. comparing means coupled to said memory reading means and to said parity recomputing means for comparing each of said plurality of corresponding parity bits with a corresponding one of said plurality of corresponding recomputed parity bits and determining if a predetermined relationship exists therebetween.

13. An apparatus according to claim 12 wherein each of the plurality of memory elements are Random Access Memories.

14. An apparatus according to claim 13 wherein said memory reading means and said memory writing means are part of a micro engine.

15. An apparatus according to claim 14 wherein said plurality of data bits comprise an instruction within the digital computer system.

16. A method for detecting errors in a computer system wherein the computer system has a plurality of memory elements, the plurality of memory elements capable of storing a plurality of data bits, each of the plurality of memory elements further having address inputs coupled together in a parallel configuration to form a common set of address bits, each of the plurality of data bits being allocated to a corresponding one of a plurality of parity domains wherein at least one parity bit is computed for each of the plurality of parity domains thereby resulting in a plurality of parity bits, comprising the steps of:

a. writing the plurality of data bits into the plurality of memory elements so that each particular one of the plurality of data bits within a corresponding one of the plurality of parity domains is stored in a separate one of the plurality of memory elements using round-robin storage allocation, said particular one of the plurality of data bits being in at least one said corresponding one of the plurality of parity domains having no greater than one data bit for each said separate one of the plurality of memory elements, the corresponding one of the plurality of parity domains corresponding to a particular address within said common set of address bits; and b. storing each of the plurality of parity bits into a selected one of the plurality of memory elements such that all of the plurality of parity bits are stored in a common memory element.

17. A method according to claim 16 further comprising:

c. reading the plurality of data bits of each of the plurality of parity domains from the plurality of memory elements so that the particular one of the plurality of data bits within the corresponding one of the plurality of parity domains is read from the separate one of the plurality of memory elements, the particular one of the plurality of data bits being in at least one of the corresponding one of the plurality of parity domains having no greater than one data bit for each of the separate one of the plurality of memory elements;

d. reading the plurality of parity bits from the selected one of the plurality of memory elements such that all of the plurality of parity bits are read from a common memory;

e. recomputing at least one recomputed parity bit for each corresponding one of the plurality of parity domains read in step (c), said each corresponding one of the plurality of parity domains corresponding to a particular address within said common set of address bits thereby resulting in a plurality of recomputed parity bits; and f. comparing the plurality of parity bits with said plurality of recomputed parity bits recomputed in step (e) and issuing an error if there is not a predetermined relationship therebetween.

18. A method according to claim 17 wherein each of the plurality of memory elements has address inputs coupled together in a parallel configuration to form a common set of address bits and the particular one of the plurality of parity domains corresponds to a particular address within said common set of address bits.

19. An apparatus for detecting errors within a digital computer system wherein the digital computer system has a plurality of memory elements for storing a plurality of data bits, each of the plurality of memory elements further having address inputs coupled together in a parallel configuration to form a common set of address bits, the plurality of data bits being allocated to a plurality of parity domains, each of the plurality of parity domains having at least one corresponding parity bit associated therewith, thereby resulting in a plurality of corresponding parity bits, comprising:

a. providing element coupled to the plurality of memory elements for providing the plurality of data bits and the plurality of corresponding parity bits to the plurality of memory elements, said providing element providing each particular one of the plurality of data bits within each of the plurality of parity domains to a separate one of the plurality of memory elements using round-robin storage allocation, each said particular one of the plurality of data bits being in at least one particular one of the plurality of parity domains having no greater than one data bit for each said separate one of the plurality of memory elements, said each of the plurality of parity domains corresponding to a particular address within the common set of address bits, and further providing the plurality of corresponding parity bits to at least one other of the plurality of memory elements.

20. An apparatus according to claims 2 or 10 wherein each of the plurality of memory elements has address inputs coupled together in a parallel configuration to form a common set of address bits and the particular one of the plurality of parity domains corresponds to a particular address within said common set of address bits.

\* \* \* \* \*